US009930695B2

(12) United States Patent
Stacey et al.

(10) Patent No.: US 9,930,695 B2
(45) Date of Patent: Mar. 27, 2018

(54) ORTHOGONAL FREQUENCY-DIVISION MULTIPLE ACCESS DISTRIBUTED CHANNEL ACCESS

(71) Applicant: Intel IP Corporation, Santa Clara, CA (US)

(72) Inventors: Robert Stacey, Portland, OR (US); Chittabratta Ghosh, Fremont, CA (US)

(73) Assignee: Intel IP Corporation, Santa Clara, CA (US)

( * ) Notice: Subject to any disclaimer, the term of this patent is extended or adjusted under 35 U.S.C. 154(b) by 154 days.

(21) Appl. No.: 14/744,232

(22) Filed: Jun. 19, 2015

(65) Prior Publication Data

US 2016/0227579 A1    Aug. 4, 2016

Related U.S. Application Data

(60) Provisional application No. 62/111,533, filed on Feb. 3, 2015.

(51) Int. Cl.
*H04W 74/08* (2009.01)
*H04W 84/12* (2009.01)

(52) U.S. Cl.
CPC ........ *H04W 74/0833* (2013.01); *H04W 84/12* (2013.01)

(58) Field of Classification Search
CPC . H04W 74/0833; H04W 84/12; H04W 72/04; H04W 72/042; H04B 7/15528; H04L 5/0055

(Continued)

(56) References Cited

U.S. PATENT DOCUMENTS

2009/0196273 A1*  8/2009  Kwon ............... H04W 8/30
                                                    370/343
2014/0169290 A1*  6/2014  Seok ................ H04W 74/006
                                                    370/329

(Continued)

FOREIGN PATENT DOCUMENTS

WO    WO-2013006840 A1    1/2013
WO    WO-2013119097 A1    8/2013

(Continued)

OTHER PUBLICATIONS

"International Application Serial No. PCT/US2016/012604, International Search Report dated May 11, 2016", 8 pgs.

(Continued)

*Primary Examiner* — Charles C Jiang
*Assistant Examiner* — Wali Butt
(74) *Attorney, Agent, or Firm* — Schwegman Lundberg & Woessner, P.A.

(57) ABSTRACT

This disclosure describes methods, apparatus, and systems related to an OFDMA Distributed Channel Access. A first computing device comprising one or more processors and one or more transceiver components may determine one or more random access resource allocations. The first computing device may generate a trigger frame associated with the one or more random access resource allocations. The first computing device may cause to send the trigger frame to one or more user devices including a first user device. The first computing device may receive from the first user device, in response to sending the trigger frame, a first uplink frame based on a first backoff count associated with the first user device.

13 Claims, 7 Drawing Sheets

(58) Field of Classification Search
USPC ....... 370/216, 235, 252, 311, 312, 315, 329, 370/330; 455/452.1, 522
See application file for complete search history.

(56) References Cited

U.S. PATENT DOCUMENTS

| | | | |
|---|---|---|---|
| 2015/0057008 A1* | 2/2015 | Seok .................... | H04L 5/0092 455/452.1 |
| 2015/0063258 A1* | 3/2015 | Merlin .................... | H04L 47/12 370/329 |
| 2015/0078352 A1* | 3/2015 | Rong ........................ | H04J 3/16 370/336 |
| 2015/0172011 A1* | 6/2015 | Aboul-Magd ........ | H04L 5/0007 370/330 |
| 2015/0201434 A1* | 7/2015 | Fang ................. | H04W 74/0816 370/335 |

FOREIGN PATENT DOCUMENTS

| | | |
|---|---|---|
| WO | WO-2013141672 A1 | 9/2013 |
| WO | WO-2014021990 A1 | 2/2014 |
| WO | WO-2016126370 A1 | 8/2016 |

OTHER PUBLICATIONS

"International Application Serial No. PCT/US2016/012604, Written Opinion dated May 11, 2016", 4 pgs.

* cited by examiner

ORTHOGONAL FREQUENCY-DIVISION MULTIPLE ACCESS DISTRIBUTED CHANNEL ACCESS

CROSS-REFERENCE TO RELATED APPLICATIONS

This application claims the benefit of U.S. Provisional Application No. 62/111,533, filed Feb. 3, 2015 the disclosure of which is incorporated herein by reference.

TECHNICAL FIELD

This disclosure generally relates to systems and methods for wireless communications and, more particularly, to scheduling medium access.

BACKGROUND

Wireless devices are becoming widely prevalent and are increasingly requesting access to wireless channels. A next generation High-Efficiency Wi-Fi (HEW) standard is under development. HEW user devices rely on resource allocations by one or more access points to facilitate data transmissions on a communication channel. One HEW user device may select a resource that may coincide with another HEW user device resource selection.

DETAILED DESCRIPTION

Figure 1:
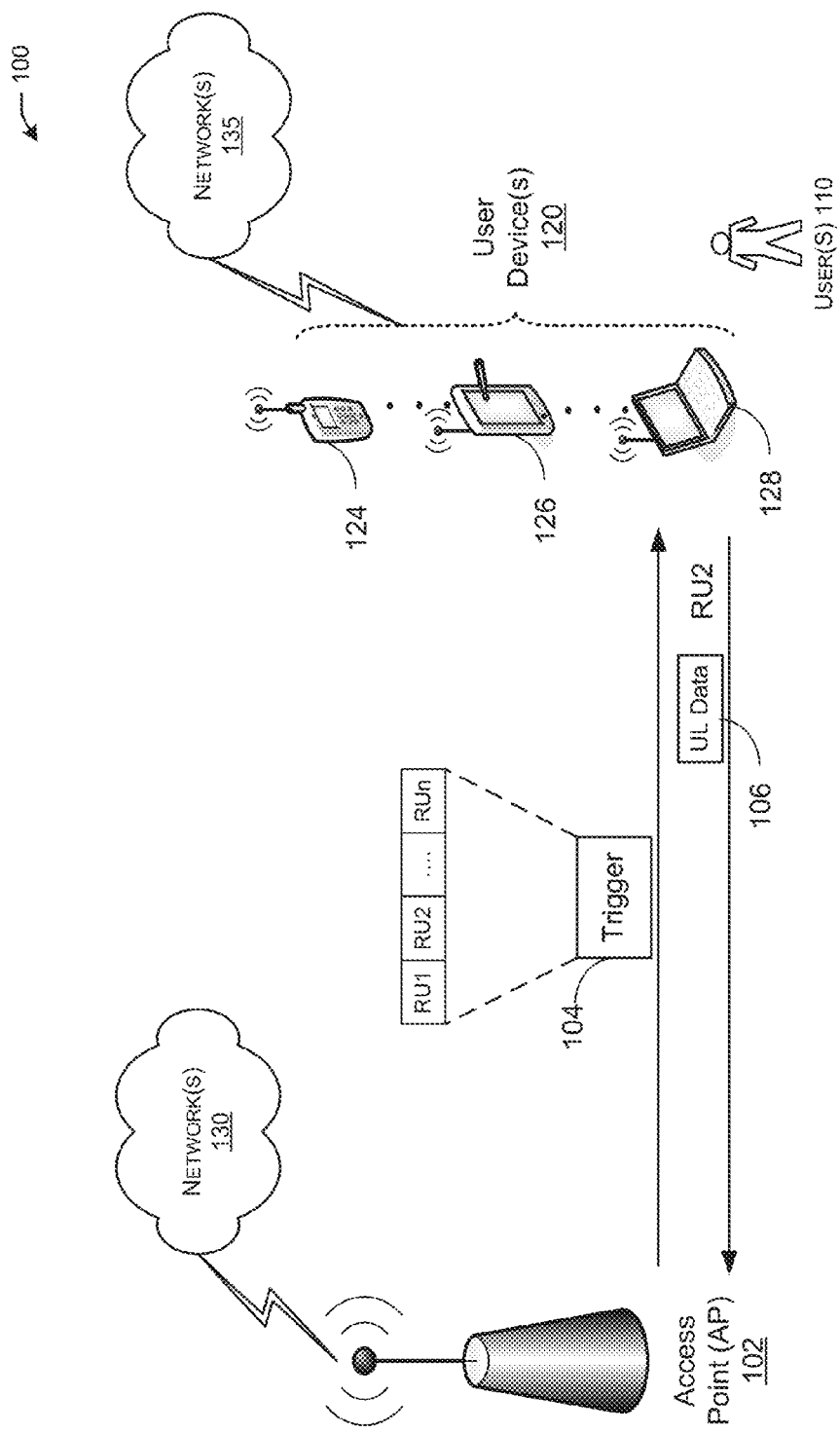
FIG. 1 depicts a network diagram illustrating an example network environment of an illustrative orthogonal frequency-division multiple access (OFDMA) distributed channel access system (ODCA), according to one or more example embodiments of the disclosure.

Example embodiments described herein provide certain systems, methods, and devices for providing signaling information to Wi-Fi devices in various Wi-Fi networks, including, but not limited to, IEEE 802.11ax. As disclosed herein, IEEE 802.11ax and HEW are synonymous.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The word "exemplary" is used herein to mean "serving as an example, instance, or illustration." Any embodiment described herein as "exemplary" is not necessarily to be construed as preferred or advantageous over other embodiments. The terms "computing device", "communication station", "station" (STA), "handheld device", "mobile device", "wireless device" and "user equipment" (UE) as used herein refer to a wireless communication device such as a cellular telephone, smartphone, tablet, netbook, wireless terminal, laptop computer, femtocell, High Data Rate (HDR) subscriber station, access point, access terminal, or other personal communication system (PCS) device. The device may be either mobile or stationary.

As used within this document, the term "communicate" is intended to include either transmitting or receiving or both transmitting and receiving. This may be particularly useful in claims when describing the organization of data that is being transmitted by one device and received by another but only the functionality of one of those devices is required to infringe the claim. Similarly, the bidirectional exchange of data between two devices (both devices transmit and receive during the exchange) may be described as "communicating", when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit and/or may include a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, a user equipment (UE), a wireless communication device, or some other similar terminology known in the art. Embodiments disclosed herein generally pertain to wireless networks. Some embodiments can relate to wireless networks that operate in accordance with one of the IEEE 802.11 standards including the IEEE 802.11ax standard.

Some embodiments may be used in conjunction with various devices and systems. Examples include: a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless pan (WPAN), and the like.

Some embodiments may be used in conjunction with a one way and/or two-way radio communication system, a cellular radio-telephone communication system, a mobile phone, a cellular telephone, a wireless telephone, a personal communication systems (PCS) device, a PDA device which incorporates a wireless communication device, a mobile or portable Global positioning system (GPS) device, a device which incorporates a GPS receiver or transceiver or chip, a device which incorporates an RFID element or chip, a Multiple Input Multiple Output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, a multi-standard radio device or system, a wired or wireless handheld device, e.g., a smartphone, a wireless application protocol (WAP) device, or the like.

Some embodiments may be used in conjunction with one or more types of wireless communication signals and/or systems following one or more wireless communication protocols. Examples include: radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee™, ultra-wideband (UWB), global system for mobile communication (GSM), 2G, 2.5G, 3G, 3.5G, 4G, Fifth Generation (5G) mobile networks, 3GPP, long term evolution (LTE), LTE advanced, enhanced data rates for GSM evolution (EDGE), or the like. Other embodiments may be used in various other devices, systems, and/or networks.

A design target for HEW is to adopt methods to improve the efficiency of Wi-Fi, and specifically the efficiency in dense deployments of Wi-Fi devices, such as in malls, conference halls, etc. HEW may use OFDMA techniques for channel access in the uplink and downlink directions. It is understood that the uplink direction is from a user device to an AP, and the downlink direction is from an AP to one or more user devices. In the uplink direction, one or more user devices may be communicating with the AP and may be competing for channel access in a random channel access manner. In that case, the channel access in OFDMA may require coordination among the various user devices that may be competing to access the operating channel simultaneously. A trigger frame may consist of a preamble along with other signaling, such as resource allocation, to coordinate the uplink OFDMA operation. A trigger frame may be a frame that contains a preamble and other fields that may be sent from an AP informing all user devices serviced by the AP that channel access is available.

With OFDMA, the AP transmits a trigger frame allocating resources, for example, assigning particular resources to specific stations. Individual stations use the allocated resource (e.g., 2 MHz of spectrum in a particular portion of the channel) to transmit their data back to the AP. Therefore, with this approach, the station may only transmit a narrow bandwidth signal assigned to that station in response to a trigger frame. However, the AP does not know which stations or how many stations have data to send or how much data each of those stations may have to send. Accordingly, resources may be allocated to stations with no data to transmit while those with data to transmit may not receive the resources needed to efficiently communicate its data to the AP.

The illustrative wireless network 100 of FIG. 1 may include one or more AP(s) 102 that communicate with one or more user device(s) 120, in accordance with IEEE 802.11 communication standards, including IEEE 802.11ax. The one or more user device(s) 120 and the one or more AP's 102 may be devices that are non-stationary without fixed locations or may be stationary with fixed locations. In some embodiments, the user device(s) 120 and AP 102 can include one or more computer systems similar to that of the functional diagram of FIG. 6 and/or the example machine/system of FIG. 7.

In accordance with embodiments of the disclosure, the wireless network 100 provides an OFDMA distributed channel access (ODCA) system that enable random access by the user devices to the available resource units that avoids the inefficiencies of scheduled allocation of the available resources by an AP. For example, the user devices 120, including HEW user devices, may select, which selection may be random, the particular resource to utilize for transmitting their data. However, even though random selection of resources by the user devices may be most efficient utilization of the available resources by the user devices in certain instance, there may be other instances where it may be desirable for the user devices to be assigned (or scheduled) access to the available resources. Accordingly, in accordance with certain embodiments of the disclosure, the ODCA may provide for the determination of whether to provide random or scheduled access.

In the case of random access, an access point (e.g., AP 102) may send an access trigger frame (e.g., trigger frame 104) indicating that resource units are available for random access such that the resource units may be selected by the user devices (e.g., user devices 124, 126 and/or 128) to send and/or receive data. For the purpose of this disclosure, where the trigger frame is used in connection with random access, the trigger frame may be referred to as a random trigger frame.

The resource units may be represented by RU1, RU2, . . . , RUn, where "n" is an integer. These resource units may be arranged in a sequence such that a user device may determine which resource unit was selected when the user device is ready to transmit its data. These resource units may be resources in time domain, frequency domain or a combination of time and frequency domain. The user device may use one of these resource units in order to send data to an access point (e.g., AP 102). Consequently, when a user device 120 detects the trigger frame 104, the user device 120 may identify it as a random access trigger frame. This may be achieved by the access point setting an identifier in the trigger frame or by other means to flag the trigger frame as a random access trigger frame. The user device may then select a resource unit from the resource units referenced in the trigger frame 104 by which to transmit at least a portion of its data to the AP 102. The selection of the resource unit may be done by employing various embodiments of the present disclosure.

The user device 120 may maintain a backoff count that may be used to select a resource unit for transmitting the user device's uplink data in a manner that may minimize the likelihood of collision with another user device 120 randomly selecting the same resource unit. It is understood that the uplink direction may be data transmission from a user device to an access point (or other devices) and a downlink direction is the data transmission from the access point (or other devices) to the user device. For example, the user device 120 may use an initial random value for the backoff count to determine which resource unit to select. The backoff count may be decremented by a first integer value until the backoff count reaches a second integer value. For example, the backoff count may be decrement by "1" every time the user device 120 detects a resource unit in the sequence of resource units referenced in the received trigger frame 104 until the backoff count reaches "0." When the backoff count reaches the second integer value, the user device 120 may select the resource unit that is associated with that backoff count value. In other words, the user device 120 may decrement the backoff count every time it detects an available random access resource unit until the backoff count reaches a predetermined integer value, which at that time, the user device may select the resource unit that was reached at the predetermined integer value. Since the resource units are provided in a sequence, whenever the backoff count reaches the second integer value, the user device determines the resource unit in the sequence that it detected when the backoff count reached that second integer.

The user device(s) 120 may be assigned one or more resource units or may randomly access the operating channel. It is understood that a resource unit may be bandwidth allocation on an operating channel in time and/or frequency domain. For example, with respect to the AP assigning resource units, in a frequency band of 20 MHz, there may be a total of 9 resources units, each of the size of a basic resource unit of 26 frequency tones. The AP 102 may assign one or more of these resource units to one or more user device(s) 120 to transmit their uplink data.

In one embodiment, with respect to the random selection of resource units by devices, the AP 102 may send a trigger frame (e.g., the trigger frame 104) to one or more user device(s) 120 (e.g., the devices 124, 126 and 128) indicating that resource units (e.g., RU1, RU2, . . . , RUn) are available. The user device(s) 120 may detect the trigger frame 104. The user device(s) 120 may decrement their backoff counts each time a resource unit is detected in sequence (e.g., RU1, RU2, . . . , RUn). When the backoff count of one user device reaches a predetermined value, the respective user device would utilize the equivalent resource unit to transmit data in the uplink direction. For example, if the backoff count of user device 128 was set to a value of 1, and the first detected resource unit is RU1, the backoff count would be equal to 0 at RU2. Consequently, user device 128 may select RU2 to send its uplink data (e.g., the data 106) if it was determined that at backoff count equal to 0, the user device 128 would send its data. The same may be true for the other devices serviced by an AP 102 wishing to transmit data in the uplink direction. For example, they may have backoff count of 3 or another integer value, and when the backoff count is decremented to 0 by counting the resource units in the trigger frame the user device may select the resource unit in the sequence where the backoff count became equal to 0.

In accordance with some IEEE 802.11ax (High-Efficiency WLAN (HEW)) embodiments, an access point may operate as a master station which may be arranged to contend for a wireless medium (e.g., during a contention period) to receive exclusive control of the medium for an HEW control period. The master station may transmit an HEW master-sync transmission at the beginning of the HEW control period. During the HEW control period, HEW stations may communicate with the master station in accordance with a non-contention based multiple access technique. This is unlike conventional Wi-Fi communications in which devices communicate in accordance with a contention-based communication technique rather than a multiple access technique. During the HEW control period, the master station may communicate with HEW stations using one or more HEW frames. Furthermore, during the HEW control period, legacy stations refrain from communicating. In some embodiments, the master-sync transmission may be referred to as an HEW control and schedule transmission.

In some embodiments, the multiple-access technique used during the HEW control period may be a scheduled orthogonal frequency division multiple access (OFDMA) technique, although this is not a requirement. In other embodiments, the multiple access technique may be a time-division multiple access (TDMA) technique or a frequency division multiple access (FDMA) technique. In certain embodiments, the multiple access technique may be a space-division multiple access (SDMA) technique.

The master station may also communicate with legacy stations in accordance with legacy IEEE 802.11 communication techniques. In some embodiments, the master station may also be configurable to communicate with HEW stations outside the HEW control period in accordance with legacy IEEE 802.11 communication techniques, although this is not a requirement.

One or more illustrative user device(s) 120 may be operable by one or more user(s) 110. The user device(s) 120 (e.g., user devices 124, 126, and 128) may include any suitable processor-driven computing device including, but not limited to, a desktop computing device, a laptop computing device, a server, a router, a switch, an access point, a smartphone, a tablet, wearable wireless device (e.g., bracelet, watch, glasses, ring, etc.) and so forth.

One or more illustrative user device(s) 120 may be operable by one or more user(s) 110. The user device(s) 120 may include any suitable processor-driven user device including, but not limited to, a desktop computing device, a laptop computing device, a server, a router, a switch, a smartphone, a tablet, wearable wireless device (e.g., bracelet, watch, glasses, ring, etc.) and so forth.

Any of the user device(s) (e.g., user devices 124, 126, 128) and AP 102 may be configured to communicate with each other via one or more communications network(s) 130, either wirelessly or wired.

Any of the communications network(s) 130 may include, but is not limited to, any one of a combination of different types of suitable communications networks, such as broadcasting networks, cable networks, public networks (e.g., the Internet), private networks, wireless networks, cellular networks, or any other suitable private and/or public networks. Further, any of the communications network(s) 130 may have any suitable communication range associated therewith and may include, for example, global networks (e.g., the Internet), metropolitan area networks (MANs), wide area networks (WANs), local area networks (LANs), or personal area networks (PANs). In addition, any of the communications network(s) 130 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP 102 may include one or more communications antennae. Communications antenna may be any suitable type of antenna corresponding to the communications protocols used by the user device(s) 120 (e.g., user devices 124, 126 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user device(s) 120.

Any of the user device(s) 120 (e.g., user devices 124, 126, 128) and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Figure 2:
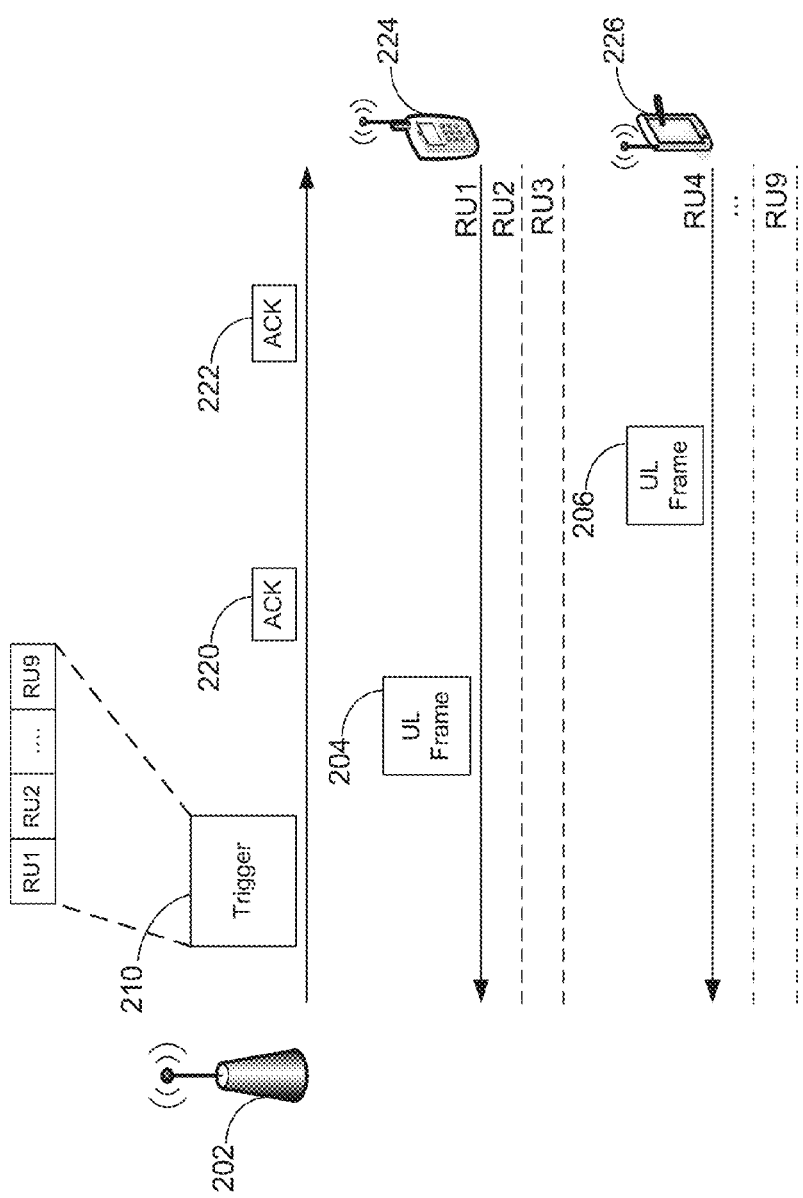
FIG. 2 depicts an illustrative schematic diagram between components of an illustrative ODCA system in accordance with one or more example embodiments of the present disclosure.

FIG. 2 depicts an illustrative schematic diagram of an ODCA system in accordance with one or more example embodiments of the present disclosure. In this illustrative example, an AP 202 may service one or more user devices (e.g., the user devices 224 and 226).

In one embodiment, AP 202 may send a trigger frame to the one or more user device(s) 120 that the AP 202 services. The trigger frame indicates to the user device(s) 120 that resource allocation is either scheduled or unscheduled (random). Based on the type of trigger frame (e.g., scheduled or random), the user device(s) 120 may either be allocated one or more resource units or may randomly utilize one or more resource units that are referenced in the trigger frame. For example, AP 202 may send a trigger frame 210 that is dedicated for random access to user devices 224 and 226. The trigger frame 210 may include the resource units (e.g., RU1, RU2, ... , RU9) arranged in a sequence and are available for data transmissions that user devices 224 and 226 may select from to transmit UL frame 204 and UL frame 206. The user device(s) 120 may select one or more resource units based on a specific value of user device(s) 120 backoff counts. For example, user device 224 having UL Frame 204 to send to AP 202, and user device 226 having UL Frame 206 to send to AP 202, may analyze their respective backoff counts to determine which resource units to use when sending their respective uplink data to AP 202.

In one embodiment, an AP 202 may allocate one or more random access resource units in a trigger frame (e.g., 210). The AP 202 may flag the trigger frame by using a predetermined identifier that identifies the trigger frame as a random access trigger frame. For example, the trigger frame may contain an identifier that the user device may know designates the trigger frame as a random access trigger frame. In other embodiments, the AP 202 may flag the trigger as a random access trigger frame by setting an Association Identifier (AID) to a value of "0", or some other AID value. It is understood that AID may be a number assigned to each user device 120 when the user device 120 is associated with an AP 202.

In one embodiment, an ODCA system may provide the ability for user devices to utilize the notion of a backoff count in order to space out their transmissions. User devices (e.g., 224 and 226) may select random access resource allocations to send their uplink data to the AP 202. For example, as seen in FIG. 2, the AP 202 may allocate 9 resource units (RU1, RU2, ... , RU9), in the trigger frame 210 to be used for random access. Some examples of an uplink frame may be a resource request frame (a frame that requests an additional resource unit allocation of a specific size for additional data transfer); a management frame, such as a probe request, association request, or access network query protocol (ANQP) frame; a quality of service (QoS) data frame; or a power save (PS) poll frame (requesting that the AP 202 deliver buffered data to the station). It is understood that the above are only examples and not to be construed as limitations. The ODCA system may provide the ability for the user device(s) 120 to decrement their respective backoff counts for each resource unit detected in a trigger frame. For example, the ODCA system may allow a user device 120 to send its uplink data based on the value of its backoff count. It is understood that the backoff count may be determined on a per user device basis. The backoff count may be independent of other backoff counts of other user device(s) 120 because each user device determines and maintains its own backoff count. It is understood that the above is not to be construed as a limitation and that other counters may be utilized and maintained by one or more devices in an ODCA system.

In one embodiment, a backoff count may be set to one or more values based on various factors associated with, for example, the user device, the network, number of data transmission collisions, etc. For example, a backoff count may be set to an integer value based on whether a user device 120 is retransmitting its uplink data due to a previous failed attempt. The attempt may have failed due to collisions, noise, network failure, etc. Further, the backoff count may be set to an integer based on whether an uplink data transmission was successful and reached an intended destination (e.g., AP 202). It is understood that the above are only some examples that a retransmission of uplink data may occur and that other reasons may cause a retransmission.

In one or more embodiments, the backoff count may be based on another integer value that may be associated with a user device 120. For example, the backoff count of a user device 120 may be based on a Contention Window for OFDMA (CWO) integer value. The CWO may have a minimum value (CWO_min) and a maximum value (CWO_max), which may be integers. The CWO value may be set by the ODCA system, by an administrator, and/or by a user 110. It is understood that the CWO value may be determined in such a way to produce the least collisions and/or retransmissions in a network. For example, in order to minimize collisions, the CWO may be determined to be a predetermined integer. For example, CWO may be set to a multiple of "2" minus "1." It is understood that the above is only for illustrative purposes and that CWO may be set to other values. The determination of the CWO values and the backoff count may be set by the ODCA system automatically, by an administrator, or by the user 110. It is understood that above are only examples and that CWO may be set to other values as needed.

In one embodiment, the resource units selected may be based on a backoff count associated with a user device 120, which may be decremented for each resource unit identified in the received trigger frame. For example, when user devices 224 and/or 226 receive the trigger frame 210, which provides random access resource units (e.g., RU1, RU2, . . . , RU9), the user devices 224 and/or 226 may decrement their backoff counts for each random access resource unit they detect in this sequence. The amount of decrementing the backoff count may be a first predetermined integer number that may be set by the ODCA system, by an administrator, and/or by a user 110. For example, the backoff count of user devices 224 and/or 226 may be decremented by an integer value of "1" every time a resource unit is detected in the same sequence they are provided by the trigger frame. In this case, detecting RU1 causes the backoff count of user device 224 to decrement by "1," and when the user device 224 detects RU2, it may decrement the backoff count by "1" again, and so on.

In one embodiment, the backoff count may be decremented until reaching a second predetermined integer. For example, if the backoff count is decremented by "1" for each random access resource unit the user device 120 detects, the user device 120 may select the corresponding resource unit when the backoff count reaches the second predetermined integer. Assuming the first predetermined integer is "3" and the second predetermined integer is "0," the user device 224 may decrement its backoff count by "1" for each random access resource unit it detects and may select the resource unit that corresponds to a backoff count equal to "0," which in this example would be the third resource unit.

In one embodiment, a user device 120 may transmit its uplink data using a random access resource unit whenever its backoff count reaches the second predetermined integer value. For example, looking at user device 226, upon receiving the trigger frame 210, the user device 226 may decrement its backoff time by "1" every time it detects a random access resource unit (e.g., RU1, RU2, . . . , RU9). The user device 226 may use the resource unit where the value of its backoff count reaches the value "0." For example, if the backoff count for user device 226 was "3," and there were 9 resource units (e.g., RU1, RU2, . . . , RU9) indicated in the trigger frame 210, the backoff reaches the value of "0" at RU4. Therefore, user device 226 may transmit its UL frame 206 using RU4.

In one embodiment, the ODCA system may provide the ability for a user device(s) 120 to select the first resource unit in the sequence of resource units (e.g., RU1, RU2, . . . , RU9) whenever the backoff count of the user device(s) 120 is initialized to a value of "0." In this case, there is no need to decrement the backoff count. For example, if the backoff count of user device 226 is "0," and the AP 202 sent a trigger frame 210 with resource units RU1, RU2, . . . , RU9 arranged in that sequence, the user device 226 may select RU1 for transmitting its data since RU1 is the first resource unit in that sequence.

In one embodiment, if AP 202 received the uplink data from a user device 120, the AP 202 may respond to the user device 120 with an acknowledgment (ACK) indicating that it received the uplink data. In one embodiment, if the user device 120 receives that ACK from the AP 202, the value for CWO may be set to CWO_min. On the other hand, if the user device 120 does not receive an ACK, CWO may be set to an integer value that may be based on factors such as retransmission, network congestion, environment, etc. For example, CWO may be set to min(2×CWO-1, CWO_max). It is understood that the above are only for illustrative purposes and that CWO may be set to other values. The determination of the CWO values and the backoff count may be set by the ODCA system automatically, by an administrator, or by the user 110. It is understood that above are only examples and that CWO may be set to other values as needed.

Figure 3:
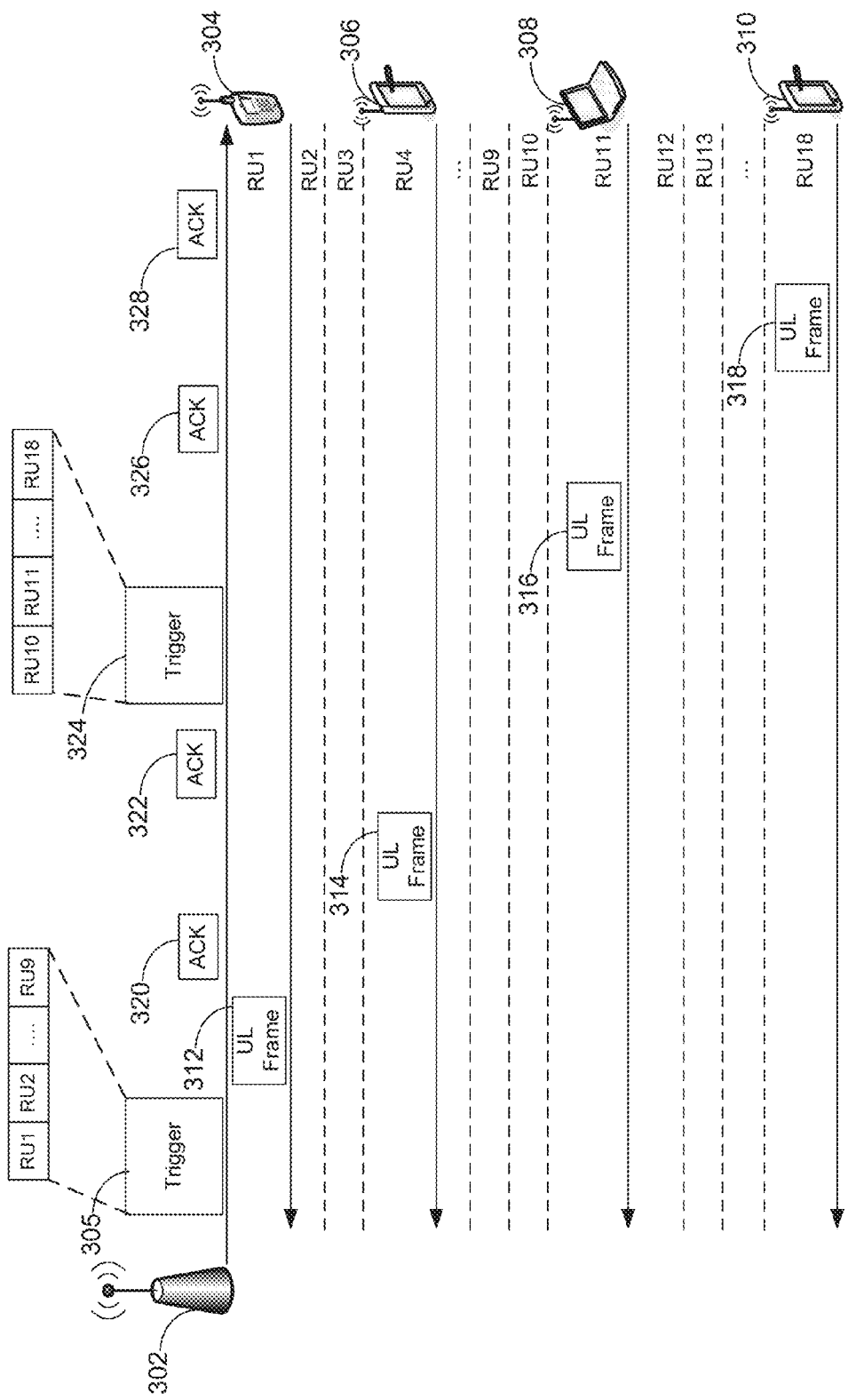
FIG. 3 depicts an illustrative schematic diagram between components of an illustrative ODCA system in accordance with one or more embodiments of the disclosure.

FIG. 3 depicts an example ODCA system in accordance with one or more embodiments of the disclosure. It is understood that the example in FIG. 3 is mainly for illustrative purposes only and that other scenarios may be envisioned. For example, assume that four user devices (e.g., 304, 306, 308, and 310) have data to send. At the time each user device identifies that it has data to send, it may select a random value for its backoff count between 0 and CWO. In this example, assume that user device 304 has a backoff count equal to "0," user device 306 has a backoff count equal to "3," user device 308 has a backoff count equal to "10," and user device 310 has a backoff count equal to "17."

Upon receiving the trigger frame (e.g., 305), user device 304 may determine that random access resource units (e.g., RU1, RU2, . . . RU9) have been allocated for uplink access by the AP 302. Since its backoff count is equal to "0," it may select the first random access resource unit (RU1) for its transmission. When user device 306 receives the trigger frame 305, it too determines that random access resource units (e.g., RU1, RU2, . . . RU9) have been allocated. It may decrement its backoff count for each random access RU it sees. When it reaches RU4, its backoff count is equal to "0" and it may select RU4 for its transmission.

Continuing with this example, user device 308 and user device 310 may decrement their backoff counts for each random access resource unit (e.g., RU1, RU2, . . . RU9) they detect in trigger frame 305. After reaching RU9 in the trigger frame 305, the final random access allocation in the first trigger frame, user device 308 backoff count is now equal to "1" and user device 310 backoff count is equal to "8." User devices 304 and 306 may transmit their uplink frames (e.g., 312 and 314) using their selected resources (e.g., RU1 and RU4). Since user devices 304 and 306 are using different resource units, collision may be avoided. As a result, the AP 302 may successfully receive the uplink frames (e.g., 312 and 314) and send ACK 320 to user device 304 and ACK 322 to user device 306 in response to receiving uplink frames 312 and 314 respectively. Upon receiving ACK 320, user device 304 may set its CWO to CWO_min. The same thing happens with user device 306 upon receiving ACK 322. In case user devices 304 and 306 have additional uplink data to send, they may select a new random integer between 0 and CWO for their backoff count, and the process may repeat by decrementing the backoff count for each random access resource unit detected in a new trigger frame.

Continuing with this example, with user devices 308 and 310, when the second trigger frame (e.g., 324) is detected, user devices 308 and 310 may continue decrementing their backoff count values. For example, the backoff count for user device 308 may reach the value of "0" at resource unit RU11. As for user device 310, its backoff count may reach "0" at resource unit RU18. Since user devices 308 and 310 may be using different resource units (e.g., RU11 and RU18), collision may be avoided. As a result, the AP 302 may successfully receive the uplink frames (e.g., 316 and 318) and send ACK 326 to user device 308 and ACK 328 to user device 310 in response to receiving uplink frames 316 and 318 respectively. Upon receiving these ACKs, the user devices 308 and 310 may reset their respective CWO values to CWO_min and select new backoff count values between 0 and CWO.

In another embodiment, if two (or more) user devices identify the same random access resource unit for their uplink data transmission, there may be a collision (e.g., both user devices transmitting using the same resource) and likely the AP 302 may be unable to successfully demodulate one of the transmissions. As a result, the AP 302 may not transmit an ACK to at least one of the user devices. In that case, the user devices may not receive the ACK and may in that case set their respective CWO to a different value due to a need to retransmit the uplink frame. The CWO may be set to an integer value that may be appropriate for the network and/or the user device. For example, in some embodiments, the CWO may be set to the min(2×CWO-1, CWO_max) or may be set to min(CWO×R−1), where R is the number of retransmissions.

In another embodiment, an exponential backoff technique may be used to reduce the collision rate when a large number of user devices are active. This may help space out repeated transmissions of the same data frame in order to alleviate network congestion. For example, the CWO may be set to min (CWO×$2^R$−1), where R is an integer representing the number of retransmissions. Further, the user devices may select new random values between 0 and CWO for their backoff count. The process may repeat by decrementing the backoff count for each random access resource unit detected in a new trigger frame. This continues until a user device is able to successfully transmit its uplink data and receive an ACK from AP 302.

In some embodiments, the retransmission may be limited to a predetermined number. For example, retransmission may be aborted if the number of retransmissions reaches a threshold integer value. For example, after 15 attempts to retransmit a failed uplink transmission, a user device may stop the retransmission process and may announce to the network that access is denied. It is understood that the above is only an example, and that the number of retransmissions may be different. The threshold may be set by the ODCA system automatically, by an administrator, or by the user 110.

Figure 4:
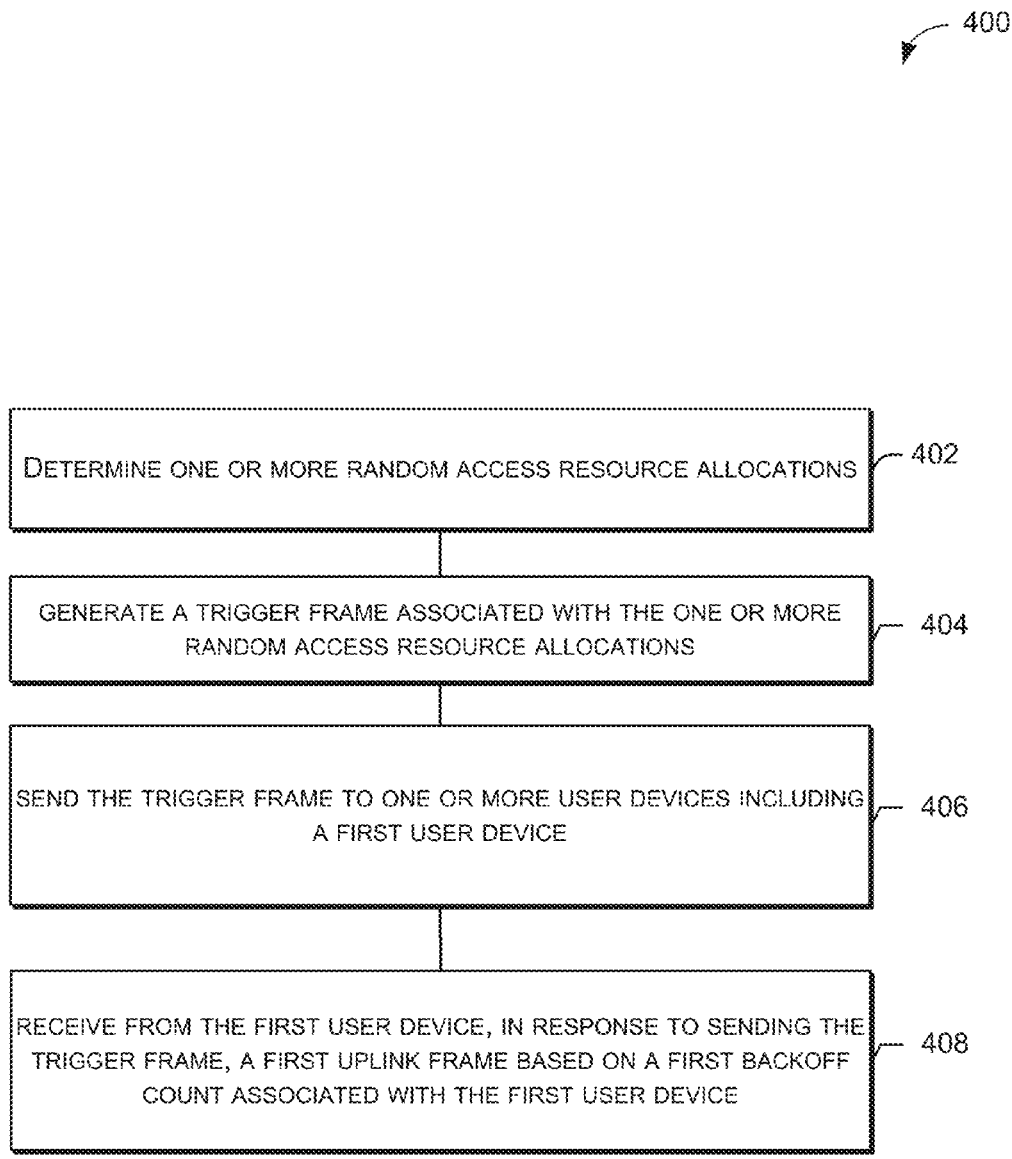
FIG. 4 depicts a flow diagram of an illustrative process for an illustrative ODCA system in accordance with one or more embodiments of the disclosure.

FIG. 4 illustrates a flow diagram of illustrative process 400 for an OFDMA distributed channel access system in accordance with one or more embodiments of the disclosure.

At block 402, the AP 102 may determine one or more random access resource allocations. These allocations may be random such that a user device 120 may randomly access a communication channel established between the AP 102 and user device 120 in order to transmit its data. These one or more random access resource allocations are in accordance with Orthogonal Frequency Division Multiplex (OFDMA) standard such that the resources are in frequency domain, time domain, or a combination of both. In order to determine that these resource allocations are for random access, the AP 102 may use an Association Identifier (AID) equal to "0" or an AID not associated with the one or more user devices or an predetermined identifier to flag the trigger frame as a random access trigger frame. In that case, a user device 120 may determine that these resources are allocated for random access.

At block 404, the AP 102 may generate a trigger frame associated with the one or more random access resource allocations. The trigger frame indicates to the user device(s) 120 serviced by the AP 102 that resource units are allocated for random access.

At block 406, the AP 102 may send the trigger frame to the user device(s) 120 such that the user device(s) 120 are able to select one or more of the resource allocations to transmit their uplink data. However, there is a possibility of two or more user device(s) 120 selecting the same resource unit that was allocated by the AP 102.

At block 408, the AP 102 receives from a user device 120 an uplink frame based on a first backoff count associated with the user device in response to sending the trigger frame. For example, the user device 120 may maintain a backoff count that is set to an integer value based on various factors such as whether a user device 120 is retransmitting its uplink data due to a previous failed attempt. The attempt may have failed due to collisions, noise, network failure, etc. Further, the backoff count may be set to an integer based on whether an uplink data transmission was successful and reached an intended destination (e.g., AP 102). Based on the value of the backoff count, a user device 120 may select one of the resource units associated with a trigger frame that was sent by the AP 102. The user device then utilizes the selected resource unit to send its uplink data to the AP 102. In return, the AP 102, upon receiving the uplink data from the user device 120, may send an acknowledgment (ACK) to the user device that the uplink data was received.

Figure 5:
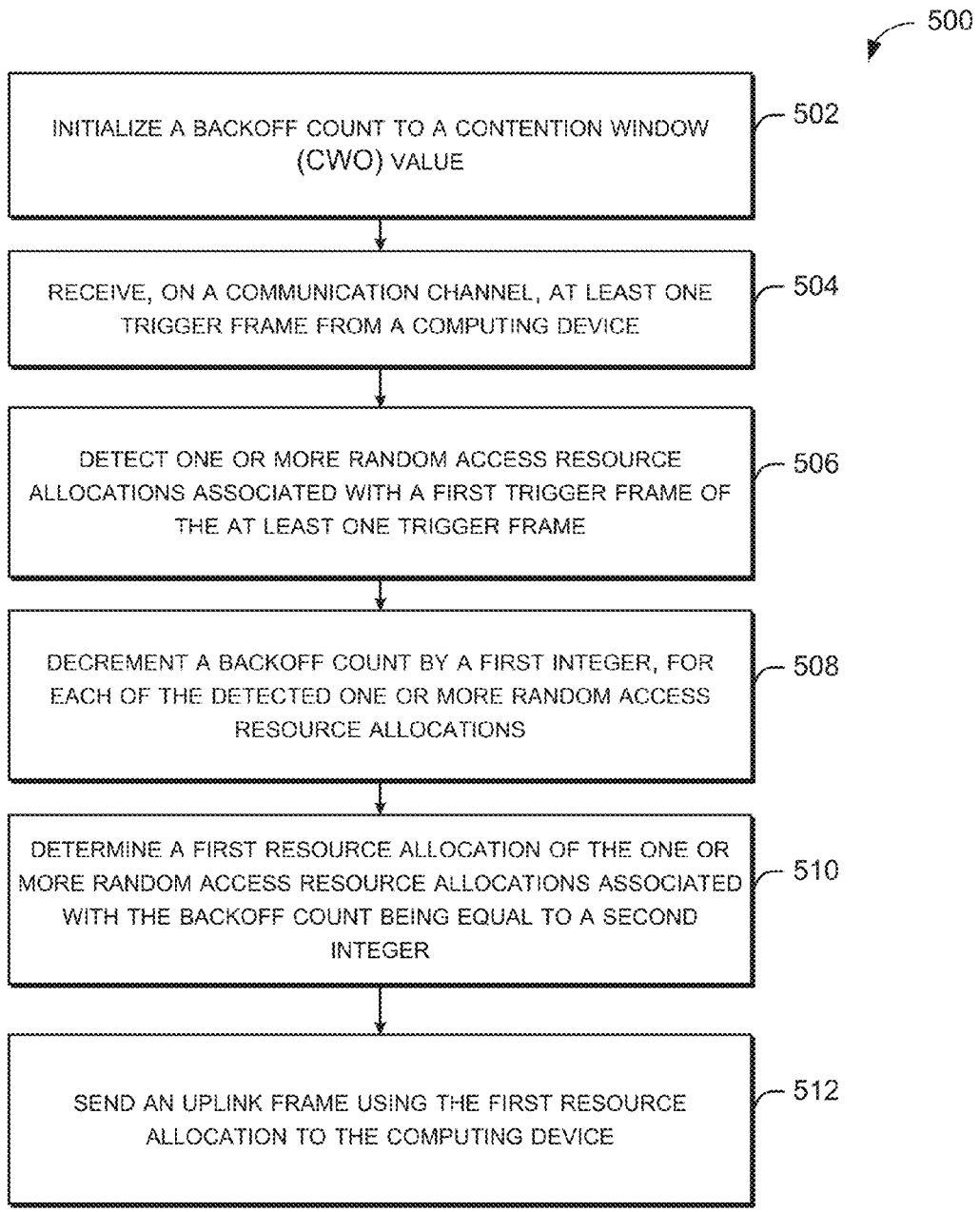
FIG. 5 depicts a flow diagram of an illustrative process for an illustrative ODCA Access system in accordance with one or more embodiments of the disclosure.

FIG. 5 illustrates a flow diagram of illustrative process 500 for an OFDMA distributed channel access system in accordance with one or more embodiments of the disclosure.

At block 502, the user device(s) 120 may initialize a backoff count to a contention window (CWO) value. The CWO may also have a minimum value (CWO_min) and a maximum value (CWO_max), which may be integers. The CWO value may be set by the ODCA system, by an administrator, and/or by a user 110. It is understood that the CWO value may be determined in such a way to produce the least collisions and/or retransmissions in a network. For example, in order to minimize collisions, the CWO may be determined to be an integer that is a multiple of "2" minus "1."

At block 504, a user device 120 may receive, on a communication channel, at least one trigger frame from an AP 102. For example, the AP 102 generates the trigger frame with one or more allocated random access resource units. The AP 102 may send the trigger frame to all the user device(s) 120 that it services.

At block 506, a user device 120 may detect one or more random access resource units associated with the trigger frame. For example, the user device 120 may analyze the trigger frame to determine the one or more resource units that are associated with that trigger frame. Since the backoff count was initialized to a certain integer value, the user device 120 may utilize that backoff count in order to make its selection of one of the random access resource units.

At block 508, the user device(s) 120 may decrement a backoff count by an integer for each of the detected random access resource units. For example, if the backoff count of a user device 120 was initialized to an integer value of "3", and if the trigger frame referenced 9 resource units (e.g., RU1, RU2, . . . , RU9), the user device 120 may decrement the backoff count for each resource unit it detects.

At block 510, the user device(s) 120 may determine a resource allocation of the one or more random access resource allocations associated with the backoff count being equal to a second integer. For example, if the backoff count may be decremented to reach the value of "0" for each of the detected resource units, the user device may select that resource unit. Continuing with the above example, since the backoff count is "3" and there are 9 resource units associated with the received trigger frame, the user device 120 may select the fourth resource unit (e.g., RU4) found in the sequence of resource units associated with the trigger frame. This is the case because for the first resource unit, the backoff count was "3", for the second resource unit, the backoff count was "2," for the third resource unit, the backoff count was "1," and for the fourth resource unit, the backoff count was "0." Therefore, the user device 120 may select that resource unit (e.g., RU4) since at that point, the backoff count was equal to "0." It is understood that the selection of a resource unit may be when the backoff count is equal to other than the value of "0," and that it could be for other integer values that may be determined by the system, by an administrator, or by the user.

At block 512, the user device(s) 120 may send an uplink frame using the first resource allocation to the computing device. In the above example, it was determined that the user device 120 may send its uplink data using the fourth resource unit (e.g., RU4). After sending its uplink data, the user device 120 may monitor the communication channel for an ACK from the AP 102.

If the backoff count did not reach the value of "0," for example, before going through the entire sequence of resource units (e.g., RU1, RU2, . . . , RU9), the user device may wait for another trigger frame from the AP 102 where more random access resource units are allocated before sending its uplink data. For example, assuming the backoff count was initialized to be "10," the first trigger frame only contained 9 resource units (RU1, RU2, . . . , RU9) and therefore, the backoff count would not reach the value "0" from only the first trigger frame. However, upon receiving a second trigger frame from AP 102, the user device 120 may be able to select the second resource unit of the second trigger frame because at that point, the backoff count would have reached the value of "0."

If the user device 120 does not receive an ACK from the AP 102, the user device 120 may set the value of CWO to a different value due to a need to retransmit the uplink frame. The CWO may be set to an integer value that may be appropriate for the network and/or the user device. For example, in some embodiments, the CWO may be set to min(2×CWO−1, CWO_max) or may be set to min(CWO× R−1), where R is the number of retransmissions. In another embodiment, the CWO may be set to min (CWO×$2^R$−1), where R is an integer representing the number of retransmissions. Accordingly, the user devices may select new random values between 0 and CWO for their backoff count. The process may repeat by decrementing the backoff count for each random access resource unit detected in a new trigger frame. This continues until a user device 120 is able to successfully transmit its uplink data and receive an ACK from AP 102.

If however, an ACK is received from the AP 102, the user device 120 may set the CWO to a CWO_min, where CWO_min is a minimum value of the CWO.

Figure 6:
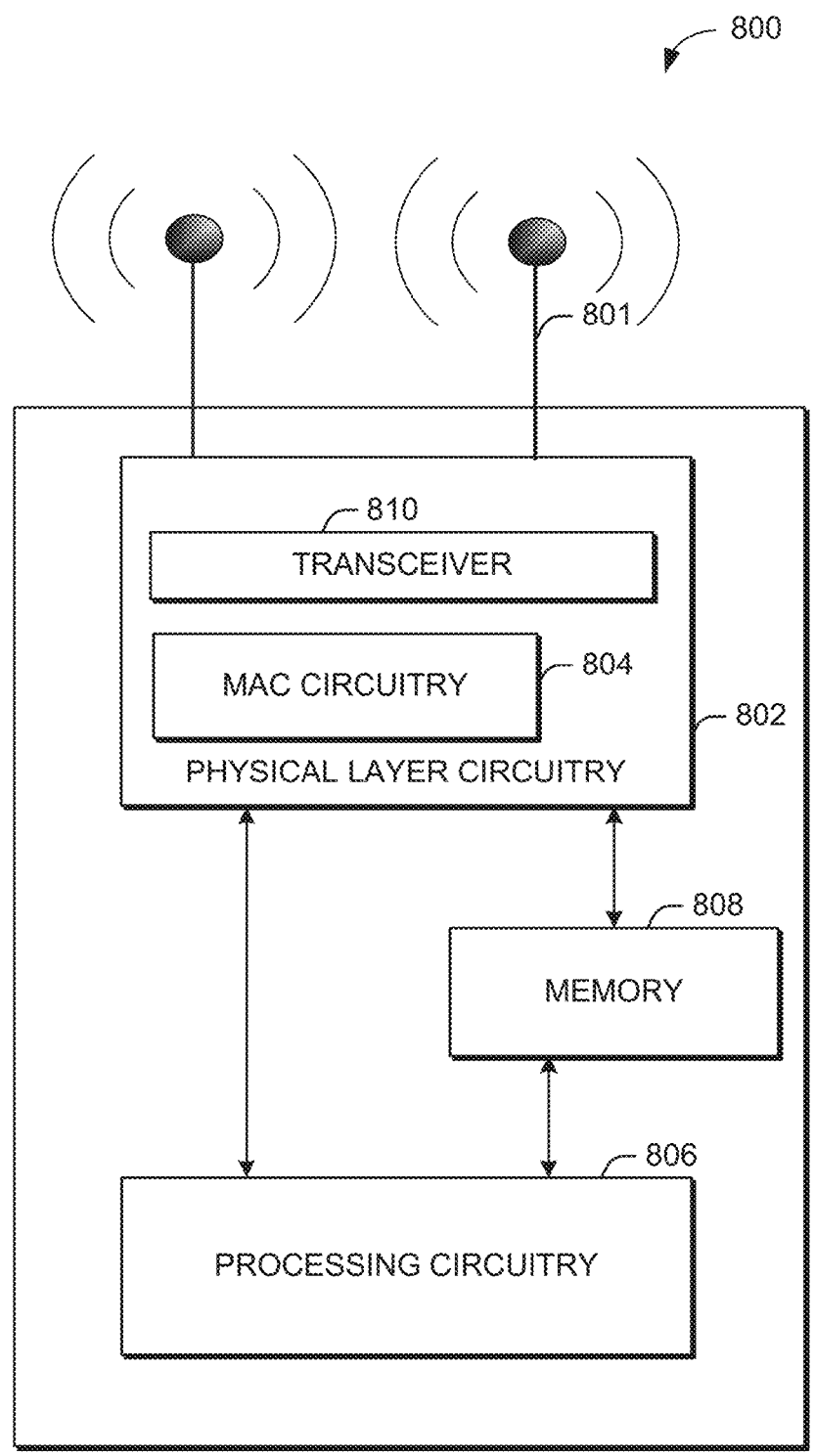
FIG. 6 illustrates a functional diagram of an example user device or example access point according to one or more example embodiments of the disclosure.

FIG. 6 shows a functional diagram of an exemplary communication station 800 in accordance with some embodiments. In one embodiment, FIG. 6 illustrates a functional block diagram of a communication station that may be suitable for use as an AP 102 (see, FIG. 1) or user device(s) 120 (see, FIG. 1) in accordance with some embodiments. The communication station 800 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 800 may include physical layer circuitry 802, having a transceiver 810 for transmitting and receiving signals to and from other communication stations using one or more antennas 801. The physical layer circuitry 802 may also include medium access control (MAC) circuitry 804 for controlling access to the wireless medium. The communication station 800 may also include processing circuitry 806 and memory 808 arranged to perform the operations described herein. In some embodiments, the physical layer circuitry 802 and the processing circuitry 806 may be configured to perform operations detailed in FIGS. 2-5.

In accordance with some embodiments, the MAC circuitry 804 may be arranged to contend for a wireless medium and configure frames or packets for communicating over the wireless medium, and the physical layer circuitry 802 may be arranged to transmit and receive signals. The physical layer circuitry 802 may include circuitry for modulation/demodulation, upconversion/downconversion, filtering, amplification, etc. In some embodiments, the processing circuitry 806 of the communication station 800 may include one or more processors. In other embodiments, two or more antennas 801 may be coupled to the physical layer circuitry 802 arranged for sending and receiving signals. The memory 808 may store information for configuring the processing circuitry 806 to perform operations for configuring and transmitting message frames and performing the various operations described herein. The memory 808 may include any type of memory, including non-transitory memory, for storing information in a form readable by a machine (e.g., a computer). For example, the memory 808 may include a computer-readable storage device, read-only memory (ROM), random access memory (RAM), magnetic disk storage media, optical storage media, flash-memory devices and other storage devices and media.

In some embodiments, the communication station 800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 800 may include one or more antennas 801. The antennas 801 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 800 may include one or more of a keyboard, a display, a non-volatile memory port, multiple antennas, a graphics processor, an application processor, speakers, and other mobile device elements. The display may be an LCD screen including a touch screen.

Although the communication station 800 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 800 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 800 may include one or more processors and may be configured with instructions stored on a computer-readable storage device.

Figure 7:
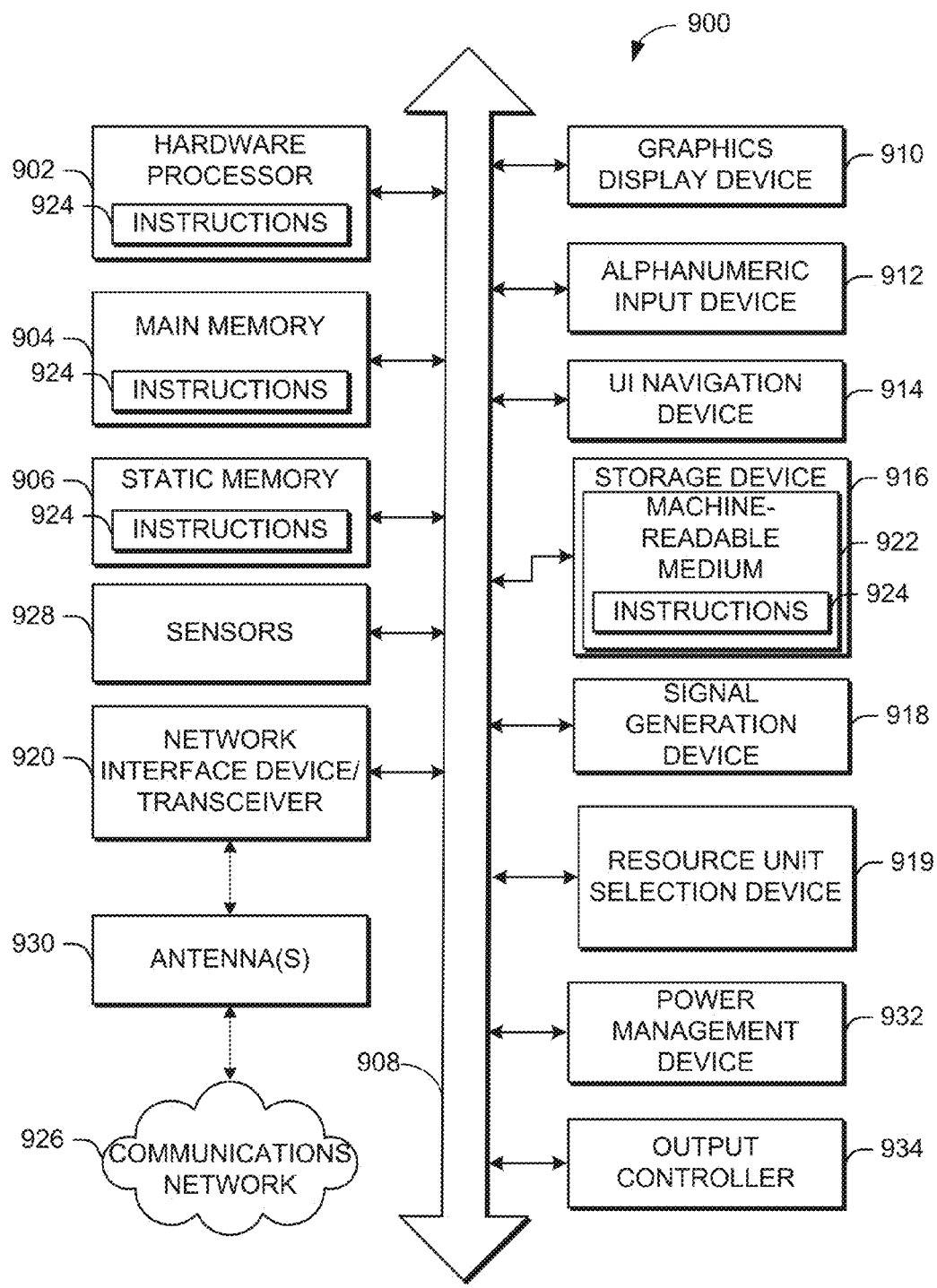
FIG. 7 shows a block diagram of an example of a machine upon which any of one or more techniques (e.g., methods) may be performed according to one or more embodiments of the disclosure discussed herein.

FIG. 7 illustrates a block diagram of an example of a machine 900 or system upon which any one or more of the techniques (e.g., methodologies) discussed herein may be performed. In other embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environments. The machine 900 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a power management device 932, a graphics display device 910, an alphanumeric input device 912 (e.g., a keyboard), and a user interface (UI) navigation device 914 (e.g., a mouse). In an example, the graphics display device 910, alphanumeric input device 912, and UI navigation device 914 may be a touch screen display. The machine 900 may additionally include a storage device (i.e., drive unit) 916, a signal generation device 918 (e.g., a speaker), a resource unit selection device 919, a network interface device/transceiver 920 coupled to antenna(s) 930, and one or more sensors 928, such as a global positioning system (GPS) sensor, compass, accelerometer, or other sensor. The machine 900 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine-readable media.

The resource unit selection device 919 may be configured to select a random access resource unit associated with a detected random access trigger frame. The resource unit selection device 919 may maintain a backoff count that may be used to select a resource unit for transmitting a user device's uplink data. For example, the resource unit selection device 919 may use an initial random value for the backoff count to determine which resource unit to select. The backoff count may be decremented by a first integer value until the backoff count reaches a second integer value. When the backoff count reaches the second integer value, the user device would select the resource unit that is associated with that backoff count value. In other words, the resource unit selection device 919 would decrement the backoff count every time it detects an available random access resource unit. Since the resource units are provided in a sequence, whenever the backoff count reaches the second integer value, the resource unit selection device 919 determines the resource unit in the sequence that it detected when the backoff count reached that second integer. For example, if the initial value of the backoff count is 2, there were 9 resource units (RU1, RU2, . . . , RU9) referenced in the trigger frame, the second integer value was 0, and the first integer value for decrementing the backoff count is 1, then the backoff count would reach the value 0 at resource unit RU3. Consequently, the user device may select RU3 to transmit its uplink data.

While the machine-readable medium 922 is illustrated as a single medium, the term "machine-readable medium" may include a single medium or multiple media (e.g., a centralized or distributed database, and/or associated caches and servers) configured to store the one or more instructions 924.

The term "machine-readable medium" may include any medium that is capable of storing, encoding, or carrying instructions for execution by the machine 900 and that cause the machine 900 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 926. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 900 and includes digital or analog communications signals or other intangible media to facilitate communication of such software.

According to example embodiments of the disclosure, there may be a device. The device may include a transceiver configured to transmit and receive wireless signals, an antenna coupled to the transceiver, one or more processors in communication with the transceiver, at least one memory that stores computer-executable instructions, and at least one processor of the one or more processors configured to access the at least one memory. The at least one processor of the one or more processors may be configured to execute the computer-executable instructions to determine a first uplink frame to be sent to a computing device on a communication channel. The at least one processor of the one or more processors may be configured to execute the computer-executable instructions to identify at least one trigger frame received on the communication channel from the computing device. The at least one processor of the one or more processors may be configured to execute the computer-executable instructions to identify one or more first random access resource allocations, including a first resource allocation and a last resource allocation, wherein the one or more first random access resource allocations are associated with a first trigger frame of the at least one trigger frame. The at least one processor of the one or more processors may be configured to execute the computer-executable instructions to determine a backoff count, the backoff count based at least in part on a integer value associated with Orthogonal Frequency Division Multiple Access (OFDMA), the backoff count having an initial backoff count. The at least one processor of the one or more processors may be configured to execute the computer-executable instructions to decrement the backoff count by a first integer, for each of the identified one or more first random access resource allocations. The at least one processor of the one or more processors may be configured to execute the computer-executable instructions to determine a resource allocation of the one or more first random access resource allocations associated with the backoff count being equal to a second integer. The at least one processor of the one or more processors may be configured to execute the computer-executable instructions to cause to send the first uplink frame using the resource allocation to the computing device. The integer value associated with OFDMA may be a contention window (CW) for Orthogonal Frequency Division Multiplex. The resource allocation may be the first resource allocation when the initial backoff count is equal to 0. The at least one processor of the one or more processors may be further configured to execute the computer-executable instructions to identify, in response to sending the first uplink frame, an acknowledgment from the computing device. The at least one processor of the one or more processors may be further configured to execute the computer-executable instructions to determine the initial backoff count is greater than or equal to a count of the one or more first random access resource allocations associated with the first trigger frame. The at least one processor of the one or more processors may be further configured to execute the computer-executable instructions to detect one or more second random access resource allocations arranged in sequence, associated with a second trigger frame of the at least one trigger frame. The at least one processor of the one or more processors may be further configured to execute the computer-executable instructions to decrement the backoff count by the first integer for each detected second random access resource allocations. The at least one processor of the one or more processors may be further configured to execute the computer-executable instructions to determine a second resource allocation in the second trigger frame, associated with the backoff count being equal to the second integer. The initial backoff count may be initialized to a random integer value between 0 and the contention window (CW). The at least one processor of the one or more processors may be further configured to execute the computer-executable instructions to determine an acknowledgment is not received from the computing device. The at least one processor of the one or more processors may be further configured to execute the computer-executable instructions to set the CW to the minimum of 2×CW-1 and CW_MAX, wherein CW_MAX is a maximum value of the CW based at least in part on the device. The at least one processor of the one or more processors may be further configured to execute the computer-executable instructions to determine when an acknowledgment is received from the computing device. The at least one processor of the one or more processors may be further configured to execute the computer-executable instructions to set the CWO to a CWO_MIN, where CWO_MIN is a minimum value of the CWO based at least in part on the device.

In example embodiments of the disclosure, there may be a non-transitory computer-readable medium storing computer-executable instructions which, when executed by a processor, cause the processor to perform operations. The operations may include determining one or more random access resource allocations including a first resource allocation. The operations may include generating a trigger frame associated with the one or more random access resource allocations. The operations may include causing to send the trigger frame to one or more user devices including a first user device. The operations may include receiving from the first user device, in response to sending the trigger frame, a first uplink frame using the first resource allocation, based at least in part on a first backoff count associated with the first user device. The first backoff count may be initialized to a random integer value between 0 and a contention window (CW) for orthogonal frequency division multiplex. The operations may further include sending, in response to receiving the first uplink frame, a first acknowledgment to the first user device. The one or more random access resource allocations may include at least one of a random access trigger frame identifier, an Association Identifier (AID) equal to 0, or an AID not associated with the one or more user devices. The first resource allocation may be associated with the first backoff count being equal to a first integer. The first backoff count may be re-initialized to a random integer value between 0 and CWO after receiving the first uplink frame from the first user device.

In example embodiments of the disclosure, there may be a method. The method may include determining, by a first computing device including one or more processors and one or more transceiver components, one or more random access resource allocations. The method may include generating a trigger frame associated with the one or more random access resource allocations. The method may include causing to send, by the first computing device, the trigger frame to one or more user devices including a first user device. The method may include receiving, by the first computing device, from the first user device, in response to sending the trigger frame, a first uplink frame based on a first backoff count associated with the first user device. The one or more random access resource allocations may be in accordance with Orthogonal Frequency Division Multiplex (OFDMA) standard. The method may further include sending, in response to receiving the first uplink frame, a first acknowledgment to the first user device. The one or more random access resource allocations may include at least one of a random access trigger frame identifier, an Association Identifier (AID) equal to 0, or an AID not associated with the one or more user devices. One of the one or more random access resource allocations may be associated with the first backoff count being equal to a first integer.

In example embodiments of the disclosure, there may be a wireless communication apparatus. The apparatus may include a means for determining, by a first computing device including one or more processors and one or more transceiver components, a first uplink frame to be sent to a computing device on a communication channel. The apparatus may include a means for identifying, by the first computing device, at least one trigger frame received on the communication channel from the computing device. The apparatus may include a means for identifying, by the first computing device, one or more first random access resource allocations, including a first resource allocation and a last resource allocation, wherein the one or more first random access resource allocations are associated with a first trigger frame of the at least one trigger frame. The apparatus may include a means for determining, by the first computing device, a backoff count, the backoff count based at least in part on a integer value associated with Orthogonal Frequency Division Multiple Access (OFDMA), the backoff count having an initial backoff count. The apparatus may include a means for decrementing, by the first computing device, the backoff count by a first integer, for each of the identified one or more first random access resource allocations. The apparatus may include a means for determining, by the first computing device, a resource allocation of the one or more first random access resource allocations associated with the backoff count being equal to a second integer. The apparatus may include a means for causing to send, by the first computing device, the first uplink frame using the resource allocation to the computing device. The integer value associated with OFDMA may be a contention window (CW) for Orthogonal Frequency Division Multiplex. The resource allocation may be the first resource allocation when the initial backoff count is equal to 0. The apparatus may further include a means for identifying, by the first computing device, in response to sending the first uplink frame, an acknowledgment from the computing device. The apparatus may further include a means for determining, by the first computing device, the initial backoff count is greater than or equal to a count of the one or more first random access resource allocations associated with the first trigger frame. The apparatus may further include a means for detecting, by the first computing device, one or more second random access resource allocations arranged in sequence, associated with a second trigger frame of the at least one trigger frame. The apparatus may further include a means for decrementing, by the first computing device, the backoff count by the first integer for each detected second random access resource allocations. The apparatus may further include a means for determining, by the first computing device, a second resource allocation in the second trigger frame, associated with the backoff count being equal to the second integer. The initial backoff count may be initialized to a random integer value between 0 and the contention window (CW). The apparatus may further include a means for determining, by the first computing device, an acknowledgment is not received from the computing device. The apparatus may further include a means for setting, by the first computing device, the CW to the minimum of 2×CW-1 and CW_MAX, wherein CW_MAX is a maximum value of the CW based at least in part on the device. The apparatus may further include a means for determining when an acknowledgment may be received from the computing device. The apparatus may further include setting the CWO to a CWO_MIN, where CWO_MIN is a minimum value of the CWO based at least in part on the device.

In example embodiments of the disclosure, there may be a wireless communication system. The system may include at least one memory that store computer-executable instructions, and at least one processor configured to access the at least one memory. The at least one processor may be configured to execute the computer-executable instructions to determine one or more random access resource allocations including a first resource allocation. The at least one processor may be configured to execute the computer-executable instructions to generate a trigger frame associated with the one or more random access resource allocations. The at least one processor may be configured to execute the computer-executable instructions to cause to send the trigger frame to one or more user devices including a first user device. The at least one processor may be configured to execute the computer-executable instructions to receive from the first user device, in response to sending the trigger frame, a first uplink frame using the first resource allocation, based at least in part on a first backoff count associated with the first user device. The first backoff count may be initialized to a random integer value between 0 and a contention window (CW) for orthogonal frequency division multiplex. The at least one processor may be further configured to execute the computer-executable instructions to send, in response to receiving the first uplink frame, a first acknowledgment to the first user device. The one or more random access resource allocations may include at least one of a random access trigger frame identifier, an Association Identifier (AID) equal to 0, or an AID not associated with the one or more user devices. The first resource allocation may be associated with the first backoff count being equal to a first integer. The first backoff count may be re-initialized to a random integer value between 0 and CWO after receiving the first uplink frame from the first user device.

In example embodiments of the disclosure, there may be a wireless communication apparatus. The apparatus may include a means for determining, by a first computing device including one or more processors and one or more transceiver components, one or more random access resource allocations including a first resource allocation. The apparatus may include a means for generate, by the first computing device, a trigger frame associated with the one or more random access resource allocations. The apparatus may include a means for causing to send, by the first computing device, the trigger frame to one or more user devices including a first user device. The apparatus may include a means for receiving, from the first user device, in response to sending the trigger frame, a first uplink frame using the first resource allocation, based at least in part on a first backoff count associated with the first user device. The first backoff count may be initialized to a random integer value between 0 and a contention window (CW) for orthogonal frequency division multiplex. The apparatus may further include a means for sending, by the first computing device, in response to receiving the first uplink frame, a first acknowledgment to the first user device. The one or more random access resource allocations may include at least one of a random access trigger frame identifier, an Association Identifier (AID) equal to 0, or an AID not associated with the one or more user devices. The first resource allocation may be associated with the first backoff count being equal to a first integer. The first backoff count may be re-initialized to a random integer value between 0 and CWO after receiving the first uplink frame from the first user device.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product comprising a computer-readable storage medium, having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams and combinations of blocks in the block diagrams and flow diagrams can be implemented by special-purpose, hardware-based computer systems that perform the specified functions, elements, steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A wireless apparatus configured for high-efficiency (HE) operation, the apparatus comprising:
   memory; and
   processing circuitry configured to:
      decode a trigger frame, the trigger frame including a parameter to indicate resource units allocated for random access, the resource units allocated for uplink data transmission to one or more HE stations (STAs) including the wireless apparatus;
      initiate an uplink orthogonal frequency division multiple access (OFDMA)-based random access procedure, in response to receipt of the trigger frame that includes the parameter, to select one of the resource units allocated for random access; and
      generate a data frame for uplink transmission in the selected resource unit, and
      wherein as part of the uplink OFDMA-based random access procedure, the processing circuitry is to:
      initialize an OFDMA Back-off (OBO) counter to a random value in the range of zero to an OFDM contention window minimum value (OCWmin);
      decrement the OBO counter for each of the resource units allocated for random access in the trigger frame; and
      select one of the resource units allocated for random access when the OBO counter reaches zero,
      wherein the trigger frame is a trigger frame configured for random access,
      wherein the trigger frame configurable to indicate that the resource units are allocated for random access for uplink data transmission by a plurality of HE STAs including the wireless apparatus, and
      wherein when the OBO counter does not reach zero after being decremented for each of the resource unit allocated for random access in the trigger frame, the uplink OFDMA-based random access procedure further configures the processing circuitry to resume decrementing the OBO counter in a next trigger frame configured for random access.

2. A wireless apparatus configured for high-efficiency (HE) operation, the apparatus comprising:
   memory; and
   processing circuitry configured to:
      decode a trigger frame, the trigger frame including a parameter to indicate resource units allocated for random access, the resource units allocated for uplink data transmission to one or more HE stations (STAs) including the wireless apparatus;
      initiate an uplink orthogonal frequency division multiple access (OFDMA)-based random access procedure, in response to receipt of the trigger frame that includes the parameter, to select one of the resource units allocated for random access; and
      generate a data frame for uplink transmission in the selected resource unit, and
      wherein as part of the uplink OFDMA-based random access procedure, the processing circuitry is to:
      initialize an OFDMA Back-off (OBO) counter to a random value in the range of zero to an OFDM contention window minimum value (OCWmin);
      decrement the OBO counter for each of the resource units allocated for random access in the trigger frame; and
      select one of the resource units allocated for random access when the OBO counter reaches zero,
      wherein each resource unit allocated for random access is assigned an associate identifier (AID) value in the trigger frame,
      wherein the parameter to indicate resource units allocated for random access comprises the AID value, and
      wherein the uplink OFDMA-based random access procedure configures the processing circuitry to decrement the OBO counter for each of the resource units assigned to the AID value in the trigger frame.

3. The apparatus of claim 2 wherein the processing circuitry is configured to randomly select one of the resource units allocated for random access when the OBO counter reaches zero.

4. The apparatus of claim 2 wherein the processing circuitry is configured to select a current resource unit allocated for random access when the OBO counter reaches zero, the current resource unit being one of the resource units allocated for random access for which the OBO counter is decremented.

5. The apparatus of claim 1 wherein the uplink OFDMA-based random access procedure configures the processing circuitry to decrement the OBO counter by one for every resource unit assigned to the AID value in the trigger frame, when the OBO counter is initialized to a value smaller than a number of resource units assigned to the AID value in the trigger frame.

6. The apparatus of claim 5 wherein the uplink OFDMA-based random access procedure configures the processing circuitry to decrement the OBO counter by a value equal to a number of resource units assigned to the AID value in the trigger frame, when the OBO counter is initialized to a value equal to or greater than a number of resource units assigned to the AID value in the trigger frame.

7. A wireless apparatus configured for high-efficiency (HE) operation, the apparatus comprising:
   memory; and
   processing circuitry configured to:
      decode a trigger frame, the trigger frame including a parameter to indicate resource units allocated for random access, the resource units allocated for uplink data transmission to one or more HE stations (STAs) including the wireless apparatus;
      initiate an uplink orthogonal frequency division multiple access (OFDMA)-based random access procedure, in response to receipt of the trigger frame that includes the parameter, to select one of the resource units allocated for random access; and
      generate a data frame for uplink transmission in the selected resource unit,
      wherein the trigger frame is received from a HE master station within a transmission opportunity (TXOP), and the data frame is generated for uplink transmission in the selected resource unit during the TXOP, the TXOP obtained by the HE master station, wherein the resource units allocated for random access comprise OFDMA resource units that are arranged within an OFDMA block, wherein the data frame is generated for uplink transmission in the selected resource unit within the OFDMA block, and wherein the trigger frame further includes an indication of other resources of the OFDMA block assigned to HE stations for scheduled access.

8. The apparatus of claim 7 further comprising transceiver circuitry and one or more antennas to receive the trigger frame and to transmit the data frame in the selected resource unit.

9. A non-transitory computer-readable storage medium that stores instructions for execution by processing circuitry of a wireless apparatus to configure the apparatus to perform operations to:

decode a trigger frame, the trigger frame including a parameter to indicate resource units allocated for random access, the resource units allocated for uplink data transmission to one or more HE stations (STAs) including the wireless apparatus, each resource unit allocated for random access having an associate identifier (AID) value in the trigger frame indicated by the parameter;

initiate an uplink orthogonal frequency division multiple access (OFDMA) based random access procedure, in response to receipt of the trigger frame that includes the parameter, to select one of the resource units allocated for random access; and generate a data frame for uplink transmission in the selected resource unit, wherein as part of the uplink OFDMA-based random access procedure, the processing circuitry is configured to:

initialize an OFDMA Back-off (OBO) counter to a random value in the range of zero to an OFDM contention window minimum value (OCWmin);

decrement the OBO counter for each of the resource units allocated for random access in the trigger frame; and select one of the resource units allocated for random access when the OBO counter reaches zero, wherein the trigger frame is a trigger frame configured for random access, wherein the trigger frame configurable to indicate that the resource units are allocated for random access for uplink data transmission by a plurality of HE STAs including the wireless apparatus, and wherein when the OBO counter does not reach zero after being decremented for each of the resource unit allocated for random access in the trigger frame, the uplink OFDMA-based random access procedure further configures the processing circuitry to resume decrementing the OBO counter in a next trigger frame configured for random access.

10. A non-transitory computer-readable storage medium that stores instructions for execution by processing circuitry of a wireless apparatus to configure the apparatus to perform operations to:

decode a trigger frame, the trigger frame including a parameter to indicate resource units allocated for random access, the resource units allocated for uplink data transmission to one or more HE stations (STAs) including the wireless apparatus, each resource unit allocated for random access having an associate identifier (AID) value in the trigger frame indicated by the parameter;

initiate an uplink orthogonal frequency division multiple access (OFDMA) based random access procedure, in response to receipt of the trigger frame that includes the parameter, to select one of the resource units allocated for random access; and generate a data frame for uplink transmission in the selected resource unit, wherein as part of the uplink OFDMA-based random access procedure, the processing circuitry is configured to:

initialize an OFDMA Back-off (OBO) counter to a random value in the range of zero to an OFDM contention window minimum value (OCWmin);

decrement the OBO counter for each of the resource units allocated for random access in the trigger frame; and select one of the resource units allocated for random access when the OBO counter reaches zero, wherein each resource unit allocated for random access is assigned an associate identifier (AID) value in the trigger frame, wherein the parameter to indicate resource units allocated for random access comprises the AID value, and wherein the uplink OFDMA-based random access procedure configures the processing circuitry to decrement the OBO counter for each of the resource units assigned to the AID value in the trigger frame.

11. A wireless apparatus of a master station configured for high-efficiency (HE) operation, the apparatus comprising:

transceiver circuitry and processing circuitry configured to:

configure a trigger frame to include a parameter to indicate resource units allocated for random access for uplink data transmission by a plurality of HE stations (STAs), each resource unit allocated for random access having a associate identifier (AID) value being indicated by the parameter in the trigger frame;

transmit the trigger frame within a transmission opportunity (TXOP) obtained by the master station; and receive uplink data units from the plurality of HE stations within at least some of the resource units within the TXOP, wherein the uplink data units are orthogonal frequency division multiple access (OFDMA) resource units within an OFDMA block, and wherein the HE ST As randomly select no more than one of the resource units indicated in the trigger frame.

12. The apparatus of claim 11 wherein the trigger frame is a trigger frame configured for random access, wherein the trigger frame configurable to indicate that the resource units are allocated for random access for uplink data transmission by a plurality of HE ST As including the wireless apparatus.

13. The apparatus of claim 12 further comprising transceiver circuitry and one or more antennas to transmit the trigger frame and to receive the uplink data units in the randomly allocated resource units.

* * * * *

UNITED STATES PATENT AND TRADEMARK OFFICE
CERTIFICATE OF CORRECTION

PATENT NO. : 9,930,695 B2  
APPLICATION NO. : 14/744232  
DATED : March 27, 2018  
INVENTOR(S) : Stacey et al.

Page 1 of 1

It is certified that error appears in the above-identified patent and that said Letters Patent is hereby corrected as shown below:

In the Claims

In Column 26, Line 49, in Claim 11, delete "ST As" and insert --STAs-- therefor

In Column 26, Line 55, in Claim 12, delete "ST As" and insert --STAs-- therefor

Signed and Sealed this  
Ninth Day of July, 2019

Andrei Iancu  
*Director of the United States Patent and Trademark Office*